United States Patent [19]

Hoppe et al.

[11] Patent Number: 5,234,294
[45] Date of Patent: Aug. 10, 1993

[54] DRILLING DEVICE FOR PRODUCING DRILLED HOLES WITH UNDERCUTS

[75] Inventors: Hartmut Hoppe, Horb; Burkhard Mayer, Herrenberg-Gueltstein, both of Fed. Rep. of Germany

[73] Assignee: fischerwerke Artur Fischer GmbH & Co. KG, Tumlingen, Fed. Rep. of Germany

[21] Appl. No.: 950,940

[22] Filed: Sep. 24, 1992

[30] Foreign Application Priority Data

Sep. 27, 1991 [DE] Fed. Rep. of Germany ....... 4132228

[51] Int. Cl.$^5$ ............................................. B23B 41/00
[52] U.S. Cl. ..................................... 408/67; 175/209; 175/213; 408/81; 408/226; 408/230
[58] Field of Search ............ 408/67, 79, 80, 81, 408/56, 59, 97, 115 B, 115 R, 202, 226, 230, 241 G, 241 S; 175/209, 210, 211, 213

[56] References Cited

U.S. PATENT DOCUMENTS

| | | | |
|---|---|---|---|
| 4,372,401 | 2/1983 | Fischer | 175/211 |
| 4,993,894 | 2/1991 | Fischer et al. | 408/202 |
| 5,092,717 | 3/1992 | Fischer | 408/59 |

FOREIGN PATENT DOCUMENTS

| | | | |
|---|---|---|---|
| 34658 | 9/1981 | European Pat. Off. | 408/202 |
| 0038405 | 10/1981 | European Pat. Off. . | |
| 0363617 | 4/1990 | European Pat. Off. . | |

*Primary Examiner*—Daniel W. Howell
*Attorney, Agent, or Firm*—Michael J. Striker

[57] ABSTRACT

A drilling device for producing drilled holes with an undercut has a drill bit having a drilling head, a depth stop, an enlargement provided between the the drilling head and the depth stop and acting as a swivel bearing, a suction bell rotatably mounted on the depth stop, a bearing washer, and a resilient, ring-shaped cushioning element provided on the depth stop. The cushioning element abuts against the bearing washer and is connected to the suction bell. The depth stop of the drill shank has a concavely curved end face and the bearing washer has a convexly curved sliding face which rests on the concavely curved end face of the depth stop.

11 Claims, 1 Drawing Sheet

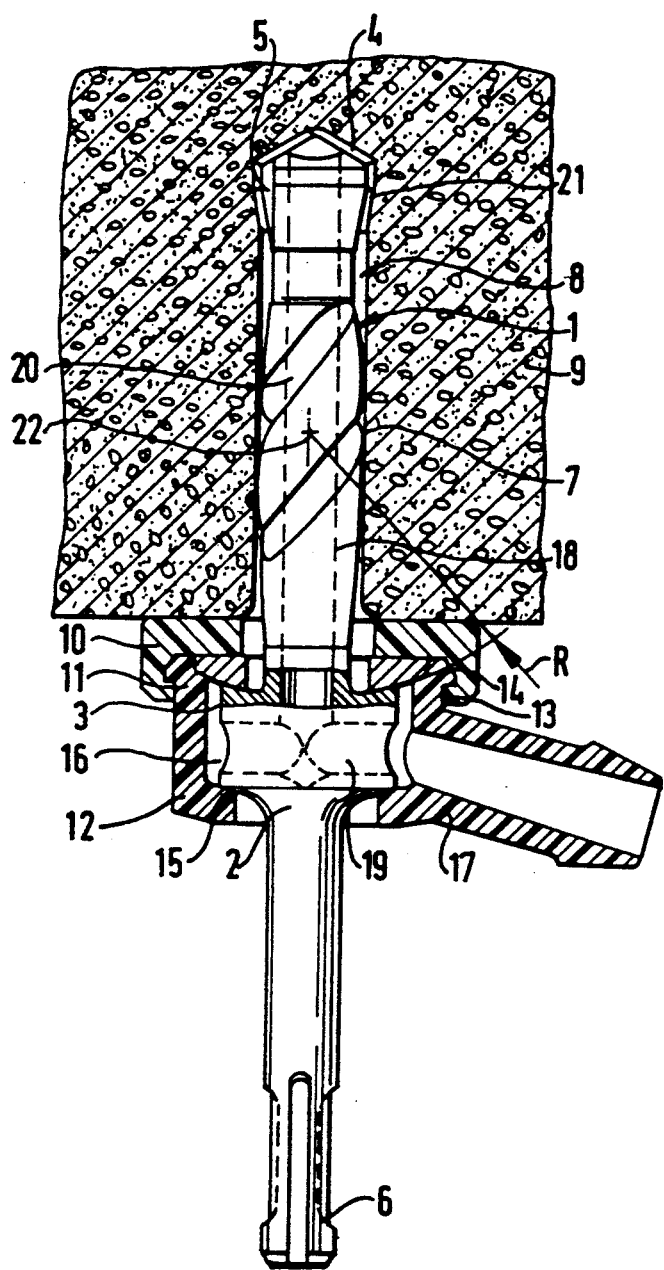

DRILLING DEVICE FOR PRODUCING DRILLED HOLES WITH UNDERCUTS

BACKGROUND OF THE INVENTION

The present invention relates to a drilling device for producing drilled holes with undercuts.

More particularly it relates to a drilling device which has a depth stop and a suction bell arranged on the depth stop.

Devices of the above mentioned general type are known in the art. One of such drilling devices is disclosed, for example in the German reference DE 3,835,025. In the drilling device disclosed in this reference the drilling dust accumulated during the operation of drilling and reaming out the undercut can be discharged through an axial through-bore of the drill shank. This drilling device also has an enlargement of the drill shank acting as a swivel bearing. The device also has a depth stop. When the depth stop is positioned on the outer surface of the masonry, the drill bit axis is swivelled out using the enlargement as the swivel point, until the tapered parts of the drill shank engage a wall of the drilled hole. In this swivelled-out position, by a gyratory movement the undercut is reamed out at the bottom of the drilled hole.

In the above described known drilling device the drill bit and the drill bit chuck are joined to one another by means of a thread, and the suction bell is rotatably mounted between the above two parts. A collar molded integrally with the drill shank acts as the depth stop. During contacting the wall surface it strikes against it and can cause the mouth of the drilled hole to break open. This occurs particularly during the swivelling operation because the inclined position of the drill bit axis causes the collar to lie lopsidedly against the surface of the masonry. Besides causing the damage to the masonry surface, the hard and lop-sided impacts may also damage the drilling device, in particular the threaded connection between the drill bit and the drill bit chuck.

SUMMARY OF THE INVENTION

Accordingly, it is an object of the present invention to provide a drilling device for produced drilled holes with undercuts which avoids the disadvantages of the prior art.

More particularly, it is an object of the present invention to provide a drilling device with a suction element, for producing drilled holes with an undercut, which has a simple construction and which prevents damage in the region of the mouth of the drilled hole and also to the drilling device.

In keeping with these objects and with others which will become apparent hereinafter, one feature of the present invention resides, briefly stated, in a drilling device for producing drilled holes with an undercut, in which the depth stop is provided with a resilient, ring-shaped cushioning element which bears on a bearing washer and is connected to the suction bell, and the bearing washer has a convexly curved sliding face which rests on a concavely curved end face of the collar formed on the drill shank.

When the drilling device is designed in accordance with the present invention it eliminates the disadvantages of the prior art and provides for the above mentioned highly advantageous results. The depth stop as mentioned is provided with a resilient ring-shaped cushioning element which preferably is composed of polyurethane or a comparable plastic material. As the depth stop is positioned against the wall surface, the cushioning element between the wall surface and the bearing washer supported against the collar of the drill shank becomes effective and cushions the blows coming from the impact drilling machine. In addition, the cushioning element has sufficient resilience for the depth stop to lie in full face contact with the wall surface even during the swivelling motion of the drill bit. During the swivelling motion, the cushioning element undergoes changes of resilient deformation in accordance with the swivelling movement, but the position of the swivelling element does not change.

Complementary surfaces of the bearing washer and the collar, and in particular the convexly curved sliding surface of the bearing washer and the correspondingly concavely curved end face of the collar formed on the drilled shank enables the drill shank to perform a swivelling motion by surface-on-surface displacement. The cushioning element and the suction bell connected with the cushioning element are not displaced on the surface of the masonry. The advantages provided by the cushioning element therefore include not only the effect that the wall surface is not damaged, but also that an optimum position of the depth stop on the wall surface is obtained for reaming out the undercut. Since also the drill bit is in one piece, the stability is high and the manipulation is simple.

The bearing washer arranged between the cushioning element and the collar can be expediently composed of case-hardened steel. The friction between the rotating collar and the bearing washer remaining stationary with the cushioning element is therefore substantially reduced. Advantageously, the bearing washer is pressed firmly into the end face of the suction bell or is bonded in as an insert by injection molding.

In accordance with another feature of the present invention, the radius of the two curved faces of the bearing washer and the collar is identical and corresponds to the distance to the mid point of the enlargement.

Still a further feature of the present invention is that the cushioning element has an inwardly projecting edge which is arranged to be positioned on the circumferential bead arranged at the front end of the suction bell.

A further feature of the present invention is that the suction bell can engage its rear inwardly directed end edge behind the rear end face of the collar formed on the drill shank.

The collar can be provided with a transverse bore into which the axial through-bore of the drill shank merges.

Finally, the drill shank can have longitudinally extending channels, drilling dust grooves, or similar means at least in the region of its enlargement.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view schematically showing a device for producing drilled holes with an undercut, in accordance with the present invention.

DESCRIPTION OF THE PREFERRED EMBODIMENT

A drilling device in accordance with the present invention has a drill bit which is identified with reference numeral 1 and has a drill shank 2. An integrally moulded collar 3 is provided on the drill shank 2. A drilling head 4 is arranged at the front end of the drill shank and has lateral cutting edges 5 projecting laterally from the shank.

The drill shank is provided with a mounting portion 6 at its rear end. The mounting portion can be clamped in a drill chuck or similar construction of a not shown drilling machine. An enlargement 7 is formed between the drilling head 4 and the collar 3. The enlargement tapers toward the drilling head 4 and the collar 3 in two opposite directions. The diameter of the enlargement corresponds approximately to the maximum dimension of the drilling head 4. Therefore as a drilled hole 8 is being formed in the masonry 9, the enlargement 7 engages the wall of the drilled hole.

The drill shank 2 is provided with a depth stop for limiting the depth of the drilled hole. The depth stop is formed as a cushioning element 10 which abuts against the collar 3 of the drill shank 2 via a bearing washer 11. The bearing washer 11 is located in the front end face of the suction bell 12. The cushioning element 10 has an inwardly projecting edge 13 which is slipped over a circumferential bead 14 of the suction bell 12, to mount the cushioning element. The suction bell 12 is fixed axially on the collar of the drill bit by an inwardly directed end face 15 which engages behind a rear end face of the collar 3 formed on the drill shank.

The suction bell has a suction chamber 16 connected through a connecting nozzle 17 for a suction hose which in turn is connected to a not shown dust extractor. The suction chamber at the same time is sealed this way. The drill shank has a through-bore 18 and the collar 3 has a transverse bore 19. The drilling dust accumulated during drilling and reaming out of the undercut is extracted through the axial through-bore 18 of the drilling shank and the transverse bore of the collar 3. Channels or drilling dust grooves 20 provided in the region of the enlargement 7 act as external air-channels for maintaining a continuous extraction flow.

When the cushioning element is positioned on the masonry surface, in order to produce the undercut 21 at the bottom of the drilled hole the drill bit axis is swivelled out using the drilling machine, sufficiently far for the parts of the drilling shank 2 tapering in the direction of the drilling head 4 and the collar 3 to engage the wall of the drilled hole. During this swivelling, the enlargement 7 cooperates with the wall of the drilled hole to form a swivel bearing. During the swivelling out the cushioning element 10 composed for example of polyurethane is deformed, so that a face-to-face contact of the stop on the masonry surface is guaranteed. During the swivelling out the concavely curved end face of the collar 3 shifts on the convexly curved end face of the bearing washer 11.

In order to achieve an exact guidance, the radius R of the two curved surfaces corresponds to the distance to the mid-point 22 of the enlargement 7. Since at the same time the collar 3 rotates on the stationary bearing washer 11, it is recommended that the bearing washer be made from case-hardened steel. The bearing washer 11 is secured in the suction bell 12. It can be composed of plastic material by being pressed in the suction bell or incorporated in it by injection molding.

It will be understood that each of the elements described above, or two or more together, may also find a useful application in other types of constructions differing from the types described above.

While the invention has been illustrated and described as embodied in a drilling device for producing drilled holes with undercuts, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A drilling device for producing drilled holes with an undercut, comprising a drill bit having a drilling head; a depth stop; an enlargement provided between said drilling head and said depth stop and acting as a swivel bearing; a suction bell rotatably mounted on said depth stop; a bearing washer; and a resilient, ring-shaped cushioning element provided on said depth stop, said cushioning element abutting against the bearing washer and being connected to said suction bell, said depth stop of said drill shank having a concavely curved end face and said bearing washer having a convexly curved sliding face which rests on said concavely curved end face of said depth stop.

2. A drilling device as defined in claim 1, wherein said drill bit has an axial through-bore.

3. A drilling device as defined in claim 1, wherein said drilling head of said drill bit has lateral cutting edges projecting laterally from said shank.

4. A drilling device as defined in claim 1, wherein said depth stop is formed as a collar.

5. A drilling device as defined in claim 1, wherein said enlargement has a mid-point, said curved faces of said bearing washer and said depth stop having radii which are identical to one another and correspond to a distance to said mid-point of said enlargement.

6. A drilling device as defined in claim 1, wherein said suction bell has a circumferential bead, said cushioning element having an inwardly projecting edge which is arranged to be positioned on said circumferential bead of said suction bell.

7. A drilling device as defined in claim 1, wherein said depth stop is formed as a collar having a rear end face, said suction bell having a rear inwardly directed end edge which engages behind said rear end face of said collar.

8. A drilling device as defined in claim 1, wherein said depth stop is formed collar which is provided with a transverse bore merging into said axial through-bore of said drill shank.

9. A drilling device as defined in claim 1, wherein said drill shank has dust evacuating means in the region of said enlargement.

10. A drilling device as defined in claim 9, wherein said dust evacuating means are formed as longitudinally extending channels.

11. A drilling device as defined in claim 9, wherein said dust evacuating means are formed as drilling dust grooves.

* * * * *